US012767045B2

(12) United States Patent
Salter et al.

(10) Patent No.: US 12,767,045 B2
(45) Date of Patent: Oct. 20, 2026

(54) VEHICLE COMMUNICATIONS

(71) Applicant: Ford Global Technologies, LLC, Dearborn, MI (US)

(72) Inventors: Stuart C. Salter, White Lake, MI (US); Kendra White, Ann Arbor, MI (US); Keith Weston, Canton, MI (US); Brendan Francis Diamond, Grosse Pointe, MI (US); John Robert Van Wiemeersch, Novi, MI (US); Ryan O'Gorman, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 18/585,735

(22) Filed: Feb. 23, 2024

(65) Prior Publication Data

US 2025/0269790 A1 Aug. 28, 2025

(51) Int. Cl.

| | |
|---|---|
| ***B60Q 5/00*** | (2006.01) |
| ***B60G 5/00*** | (2006.01) |
| ***G06V 20/58*** | (2022.01) |
| ***G10L 17/00*** | (2013.01) |

(52) U.S. Cl.
CPC ............. *B60G 5/005* (2013.01); *G06V 20/58* (2022.01); *G10L 17/00* (2013.01)

(58) Field of Classification Search
CPC ........... B60Q 5/005; G10L 17/00; G07C 9/37; G07C 9/00563; G07C 9/00309; G07C 9/00571; G07C 2209/63; G07C 2209/64; G07C 9/25; G07C 9/253; G06V 20/58; G06V 40/103; H04L 67/306; B60R 25/25
See application file for complete search history.

(56) References Cited

U.S. PATENT DOCUMENTS

| | | | | |
|---|---|---|---|---|
| 9,387,824 | B2 | 7/2016 | Pisz et al. | |
| 9,802,571 | B2 | 10/2017 | Shreve et al. | |
| 10,386,835 | B2 | 8/2019 | Vogt et al. | |
| 10,740,796 | B2 | 8/2020 | Brubaker | |
| 10,803,687 | B1 * | 10/2020 | Khamis | G07C 9/00309 |
| 11,210,877 | B1 * | 12/2021 | Amadi | G07C 9/00309 |
| 11,577,722 | B1 * | 2/2023 | Packer | G05D 1/0088 |
| 2007/0200669 | A1 * | 8/2007 | McBride | B60R 25/245 340/5.72 |

(Continued)

FOREIGN PATENT DOCUMENTS

| | | |
|---|---|---|
| CN | 114007199 A | 2/2022 |
| CN | 116016754 A | 4/2023 |

(Continued)

OTHER PUBLICATIONS

Tesla Support, "Vehicle Safety and Security Features", https://www.tesla.com/support/vehicle-safety-security-features.

(Continued)

*Primary Examiner* — Curtis J King
(74) *Attorney, Agent, or Firm* — Frank Lollo; Brooks Kushman P.C.

(57) ABSTRACT

A vehicle may detect an entity within a specified distance of a vehicle, output a first audio outside of the vehicle in response to detecting the entity, classify the entity based on data collected about the entity after outputting the first audio, and output a second audio based on classifying the entity.

20 Claims, 3 Drawing Sheets

(56) References Cited

U.S. PATENT DOCUMENTS

| | | | | |
|---|---|---|---|---|
| 2007/0200672 | A1* | 8/2007 | McBride | G07C 9/00309 340/5.72 |
| 2020/0238952 | A1 | 7/2020 | Lindsay et al. | |
| 2020/0346580 | A1* | 11/2020 | Salter | B60K 35/26 |
| 2021/0033727 | A1* | 2/2021 | Sahara | G01S 13/0209 |
| 2021/0070596 | A1* | 3/2021 | Nedjimi | B66F 9/0755 |
| 2021/0097788 | A1* | 4/2021 | Woo | G08B 13/1654 |
| 2021/0241006 | A1* | 8/2021 | Anam | G08G 1/166 |
| 2021/0253025 | A1* | 8/2021 | Akachi | B60Q 9/00 |
| 2021/0309183 | A1* | 10/2021 | Bielby | B60R 16/037 |
| 2021/0370860 | A1* | 12/2021 | Nakamura | B60R 21/01542 |
| 2022/0176911 | A1* | 6/2022 | Nayak | B60R 25/31 |
| 2023/0001871 | A1 | 1/2023 | Neubauer et al. | |
| 2023/0058007 | A1* | 2/2023 | Somanath | B60W 60/00253 |
| 2023/0177888 | A1* | 6/2023 | Salter | G06Q 10/06315 |
| 2023/0237130 | A1* | 7/2023 | Evans | G06F 21/34 726/17 |
| 2024/0101059 | A1* | 3/2024 | Bharwani | A01M 29/10 |
| 2024/0114253 | A1* | 4/2024 | Hoshino | B60R 1/26 |

FOREIGN PATENT DOCUMENTS

| | | | |
|---|---|---|---|
| DE | 19642686 | C1 | 12/1997 |
| DE | 102018200138 | A1 | 7/2019 |
| WO | 2020108859 | A1 | 6/2020 |

OTHER PUBLICATIONS

Tesla, "Emergency Call", https://www.tesla.com/ownersmanual/modely/en_eu/GUID-8333FCE9-A70A-4470-8EBB-867423A1B5DC.html.

Youtube, Tesla Sentry Mode: A Very Very Very in Depth Walk-through Guide // #3, https://www.youtube.com/watch?v=TF1qdUcLCCM—Re-Submission.

* cited by examiner

VEHICLE COMMUNICATIONS

BACKGROUND

Vehicles typically include sensors for collecting data about the vehicle and/or an environment around the vehicle. In some examples, sensor data can be used by vehicle systems to actuate vehicle components.

DETAILED DESCRIPTION

Introduction

Described herein are techniques for detecting and interacting with entities within a specified distance of a vehicle. A vehicle computer may classify an entity based on data collected by vehicle sensors. The vehicle may then actuate components based on the classification of the entity. For example, the vehicle may output audio, unlock doors, send a message to a remote computer, etc.

Accordingly, included in the present disclosure is a system comprising a computer that includes a processor and a memory, the memory storing instructions executable by the processor to: detect an entity within a specified distance of a vehicle, output a first audio outside of the vehicle in response to detecting the entity, classify the entity based on data collected about the entity after outputting the first audio, and output a second audio based on classifying the entity.

A vehicle feature may be activated based on classifying the entity.

The detection of the entity within the specified distance of the vehicle may be based on image data.

The second audio may be responsive to a communication by the entity.

The second audio may be selected from a stored plurality of phrases.

The entity may be identified based on stored data collected from the entity prior to outputting the first audio.

The entity may be classified based on a plurality of images collected at different times.

The entity may be classified based on a tone of the entity.

The classification of the entity may be one of threatening or nonthreatening.

The first audio may be output in a first language and the second audio may be output in a second language based on detecting the second language in an entity audio.

A first entity and a second entity may be detected within the specified distance of the vehicle, the first entity being prioritized based on a risk score.

A method comprises: detecting an entity within a specified distance of the vehicle, outputting a first audio outside of the vehicle in response to detecting the entity, classifying the entity based on data collected about the entity after outputting the first audio, and outputting the second audio based on classifying the entity.

A vehicle feature may be activated based on classifying the entity.

The entity may be detected within the specified distance of the vehicle based on image data.

The second audio may be responsive to a communication by the entity.

The second audio may be selected from a stored plurality of phrases.

The entity may be identified based on stored data collected from the entity prior to outputting the first audio.

The entity may be classified based on a tone of the entity.

The classification of the entity may be one of threatening or nonthreatening.

The first audio may be output in a first language and the second audio may be output in a second language based on detecting the second language in an entity audio.

Exemplary System Elements

Figure 1:
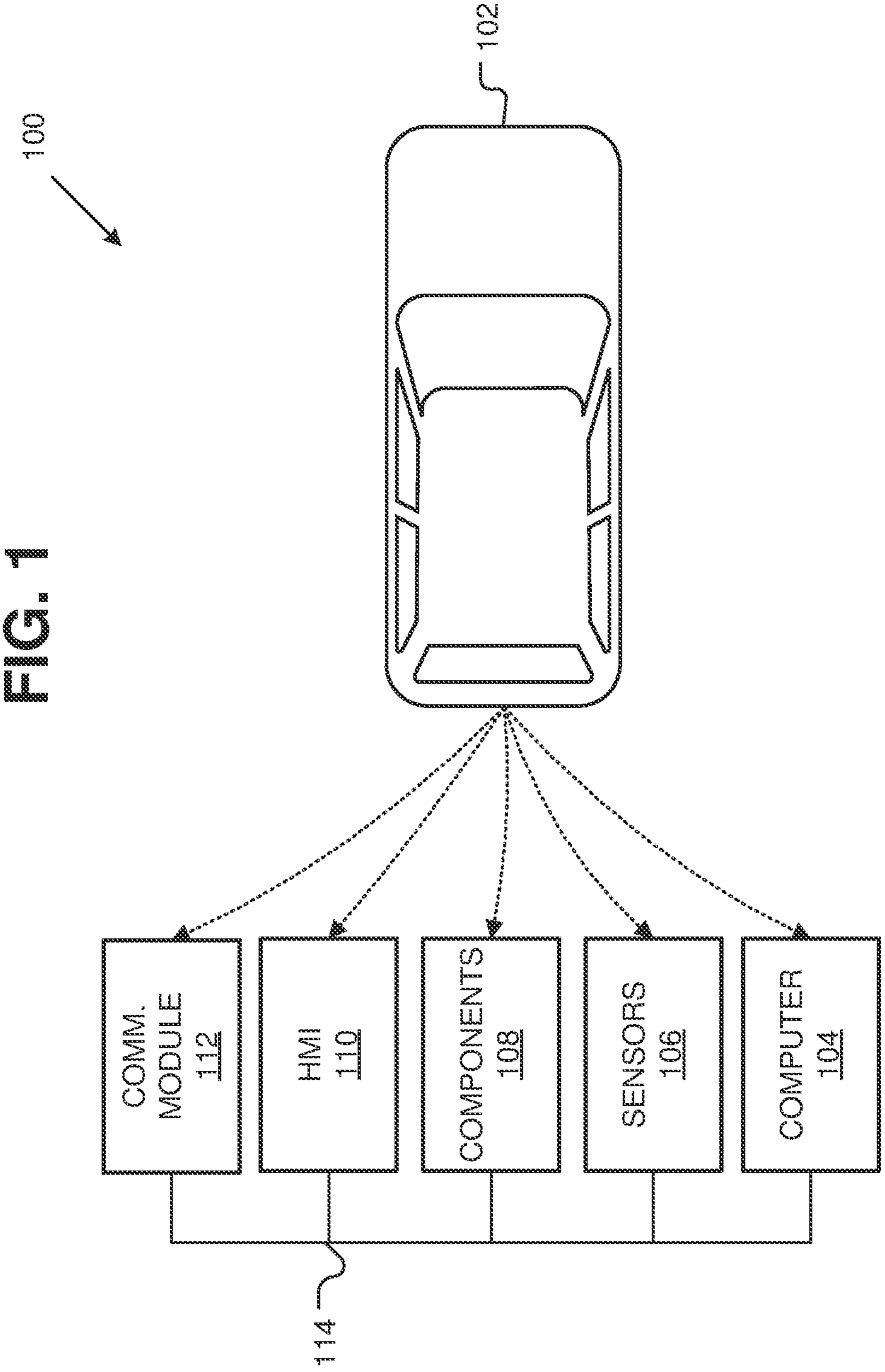
FIG. 1 is a block diagram of an example vehicle.

FIG. 1 is a block diagram of a vehicle system 100 for providing digital images for vehicle operation. The vehicle 102 includes a computer 104 having a memory that includes instructions executable by the computer 104 to carry out processes and operations, including as described herein. The computer 104 may be communicatively coupled via a communication network, such as a vehicle network 114, with sensors 106, components 108, a human machine interface (HMI) 110 and a communication module 112 in the vehicle 102. The vehicle 102 may be any passenger or commercial automobile such as a car, a truck, a sport utility vehicle, a crossover, a van, a minivan, a taxi, a bus, ICE, BEV, Hybrid, etc.

As mentioned above, the vehicle computer 104 includes a processor and a memory. The memory includes one or more forms of computer readable media, and stores instructions executable by the vehicle computer 104 for performing various operations, including as disclosed herein. For example, a vehicle computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation (e.g., an ASIC for processing sensor data and/or communicating the sensor data). In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in a computer 104.

The memory can be of any type (e.g., hard disk drives, solid state drives, servers, or any volatile or non-volatile media). The memory can store the collected data sent from the sensors 106. The memory can be a separate device from the computer 104, and the computer 104 can retrieve information stored by the memory via a network 114 in the vehicle 102 (e.g., over a CAN bus, a wireless network, etc.). Alternatively or additionally, the memory can be part of the computer 104 (e.g., as a memory of the computer 104).

The vehicle computer 104 may include programming to operate one or more of vehicle brakes, propulsion (e.g., control of acceleration in the vehicle 102 by controlling one or more of an internal combustion engine, electric motor, hybrid engine, etc.,) steering, climate control, interior and/or exterior lights, etc., as well as to determine whether and when the computer 104, as opposed to a human operator, is to control such operations.

The computer 104 may include or be communicatively coupled to (e.g., via a vehicle network 114 such as a communications bus as described further below) more than one processor, (e.g., included in components 108 such as sensors 106, electronic control units (ECUs) or the like included in the vehicle 102 for monitoring and/or controlling various vehicle components 108, e.g., a powertrain controller, a brake controller, a steering controller, etc.). The computer 104 is generally arranged for communications on a vehicle communication network 114 that can include a bus in the vehicle 102 such as a controller area network CAN or the like, and/or other wired and/or wireless mechanisms. Alternatively or additionally, in cases where the computer 104 actually comprises a plurality of devices, the vehicle communication network 114 may be used for communications between devices represented as the computer 104 in this disclosure. Further, as mentioned below, various controllers and/or sensors 106 may provide data to the computer 104 via the vehicle communication network 114.

Via the vehicle network 114, the vehicle computer 104 may transmit messages to various devices in the vehicle 102 and/or receive messages (e.g., CAN messages) from the various devices (e.g., sensors 106, ECUs, etc.). Alternatively, or additionally, in cases where the vehicle computer 104 actually comprises a plurality of devices, the vehicle communication network 114 may be used for communications between devices represented as the vehicle computer 104 in this disclosure. Further, as mentioned below, various controllers and/or sensors 106 may provide data to the vehicle computer 104 via the vehicle communication network 114.

The vehicle 102 typically includes a variety of sensors 106. A sensor 106 is a device that can obtain one or more measurements of one or more physical phenomena. Some sensors 106 detect internal states of the vehicle 102, for example, wheel speed, wheel orientation, and engine and transmission variables. Some sensors 106 detect the position or orientation of the vehicle 102, for example, global positioning system GPS sensors. Some sensors 106 detect objects, for example, radar sensors, scanning laser range finders, light detection and ranging LIDAR devices, and image processing sensors such as cameras. Further sensors 106 detect sounds, for example dynamic or condenser microphones, piezoelectric transducers, ultrasonic sensors, acoustic emission sensors, etc. Such sensors for detecting sound are herein referred to as audio sensors. Audio sensors detect sound waves by measuring vibrations and converting them to electrical signals.

The vehicle 102 includes a variety of audio sensors (e.g., microphones, that can detect sound internal to the vehicle 102 and/or external to the vehicle 102). An audio sensor may include or be connected to an analog-to-digital (A/D) converter to facilitate the conversion of sound waves to electrical signals. As an example, the A/D converter may utilize sampling to convert sound to electrical signals. An audio sensor and/or A/D converter may be in communication with the vehicle computer 104 such that the electrical signals may be transmitted to the vehicle computer 104. One or more audio sensors may be installed or deployed in or on any suitable part of the vehicle 102 to provide detection of audio phenomena as described herein. For example, audio sensors for capturing sound emitted from or within the interior of the vehicle 102 may be provided in a vehicle dash panel, interior sides of a vehicle 102, the interior of the vehicle roof, etc. As another example, audio sensors for capturing sound emitted exterior to the vehicle 102 may be supported by the exterior sides of the vehicle 102, the exterior of the vehicle roof, in or on vehicle bumpers or fascia, the vehicle hood, etc. Multiple audio sensors may be installed at different positions in or on the vehicle 102 in order to provide sound capture and/or distinguish between multiple sound sources as described herein. The audio sensors may be any suitable type for detecting sound as described herein.

The vehicle 102 may include one or more sound output devices 116 (i.e., speakers). A speaker is a device that can output sound. As an example, a speaker can include a digital-to-analog (D/A) converter that converts electrical signals to vibrations to generate sound at a specified frequency. As an example, the D/A converter may input the electrical signal to a piecewise constant function. A speaker may be in communication with the vehicle computer 104 so as to receive electrical signals to be transmitted by the speaker in the form of sound. The speaker may be any suitable type of speaker to output sound internal to the vehicle 102 and/or external to the vehicle 102. A speaker may also operate as a microphone. That is, a device may output audio as well as detect audio. In this document, sound output devices 116 and sensors 106 are referred to as separate elements, though it is to be understood that the operations of a speaker and a microphone elements could be performed by a single sound output device 116. The speaker may be deployed or installed in or on the vehicle 102 (e.g., in or on a surface of the vehicle 102). As an example, the speaker may be supported by the hood of the vehicle 102 so that output sound is likely to be detectable by listeners positioned in front of the vehicle 102.

Figure 2:
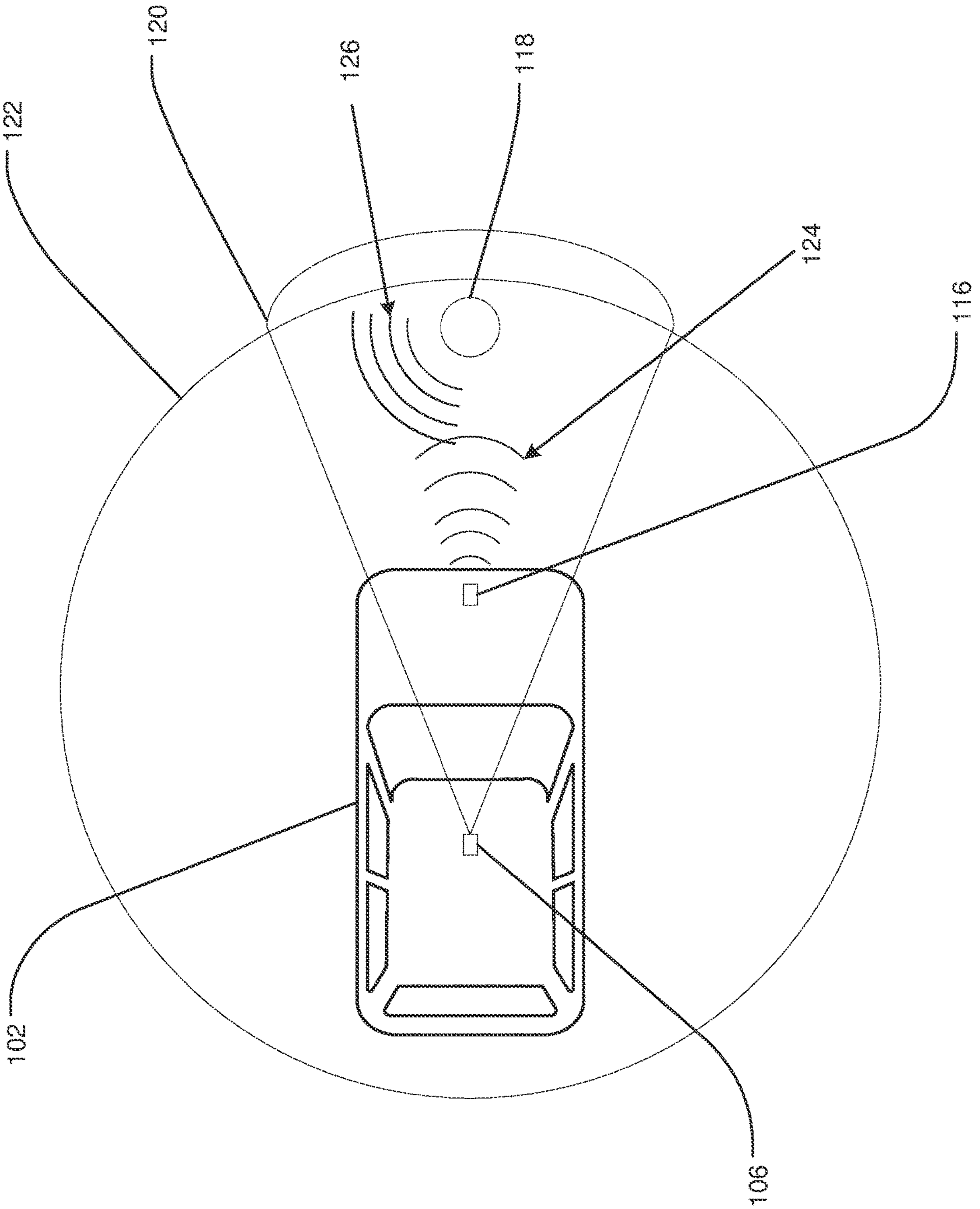
FIG. 2 illustrates an example vehicle detecting an entity.

FIG. 2 illustrates an example scenario in which an entity 118 could be detected by a vehicle computer 104 from vehicle sensor data. The entity 118 may be any object or event detectable by the vehicle sensors 106. In various examples described herein, the entity 118 is a person, though as further non-limiting examples the entity 118 could be a second vehicle, a fire, etc.

As described above the entity 118 may be any object detectable from data received from vehicle sensors 106. A vehicle computer 104 could use any suitable object recognition algorithm or technique to detect and/or classify an object. For example, a neural network could be trained using data collected about objects to classify objects (e.g., to distinguish persons from other objects based on camera sensor data).

As another example of an entity 118, the entity 118 may be an event such as a fire, an altercation between two or more people, etc. That is, the entity 118 may include detected happenings that are not objects. Any suitable technique to recognize and/or classify objects could be used to detect events (e.g., a neural network could be trained for object recognition or classification). Further, a neural network or the like could process sensor data in addition to or as an alternative to image data. Thus, in an example where the entity 118 is a fire, the vehicle may include sensors 106 which are heat sensors or thermal cameras. Data collected by such sensors could include an image, and/or could include a temperature of the entity 118. If the temperature exceeds, for example, 160 degrees Fahrenheit, and/or based on image data, a computer 104 could classify the entity 118 as a fire. As another example, if the entity is an altercation, a computer 104 could input image data and/or audio data to one or more neural networks trained to classify altercations.

The vehicle computer may identify an entity. Identifying the entity herein means determining who the entity is (i.e., determining that the entity is a particular individual). For example, an entity could be classified as a person, and then identified as "Jane Doe." The vehicle computer may identify an entity using any suitable recognition technique based on stored or collected data. As an example, if the vehicle computer has stored data about the entity such as an image of the face of the entity, the vehicle may compare the stored image to a newly collected image of the face of an entity. If the computer, by image recognition or any other suitable technique, determines that the two images match, the computer has identified the entity as the same entity from whom the stored data was collected.

As seen in FIG. 2, a sensor 106 may be positioned in or on the vehicle 102 to provide a field of view 120 extending relative to the vehicle body. The sensor 106 may be any type suitable to detect an entity 118 such as a camera, lidar, radar, etc. In the present example, the sensor 106 is a camera. The field of view 120 can be determined by specifications of the camera (e.g., a viewing angle providing by the camera) and pose or orientation of the camera (e.g., a pitch, roll, and yaw of an axis of the camera lens relative to a horizontal plane of the vehicle 102). The field of view 120 is referred to as fixed or static when the camera is installed such that its pose cannot be changed. Additionally or alternatively, the camera may be moveably supported by the vehicle 102 and actuatable by the vehicle computer 104 such that the camera pose and/or a focus or orientation of a lens can be changed, and field of view 120 thereby dynamically adjusted.

A camera can generate image data of its field of view 120. Image data from a camera typically includes a sequence of image frames from the field of view 120 (i.e., image data may be video data). The image frames can be input to the vehicle computer 104 via the vehicle network 114. The vehicle computer 104 can analyze the image frames (e.g., can utilize suitable image recognition techniques) and may make a determination of whether the entity 118 is within a specified distance 122 of the vehicle 102 as described further below.

The vehicle computer 104 may be programmed to detect an entity 118 within a specified distance 122 of the vehicle 102. For example, the vehicle computer 104 may detect the entity 118 and determine that the entity 118 is within the specified distance 122 of the vehicle 102 (e.g., measured as a radius around a point defined in or on the vehicle 102, as a distance from an edge of a vehicle 102 as defined by a vehicle body, or based on any other suitable reference) based on collected data about the entity 118. The vehicle computer 104 can make a determination of an entity 118 being within a specified distance 122 of the vehicle 102 when it determines that the entity 118, or at least some portion of the entity 118, is detected within a distance of the vehicle 102 that is less than the specified distance 122. The detection of the entity 118 within the specified distance 122 of the vehicle 102 may be based on data captured by the sensors 106. As an example, the data may be image data. The distance may be measured from any selected point on the vehicle 102. As an example, the distance may be measured from the sensor 106 which collected the entity data. As a further example, the distance may be measured from a surface of the vehicle 102 closest to the entity 118.

The specified distance 122 may be any suitable distance determined by the vehicle computer 104 and or a vehicle operator. For example, the vehicle computer 104 may determine a specified distance 122 based on the vehicle 102 entering a geographic location (i.e., the vehicle computer 104 could store specified distances 122 for respective geographic locations, and could retrieve a specified distance 122 for a location from memory based on data from a location sensor, e.g., a GPS sensor). A specified distance 122 (i.e., a distance from a vehicle 102 within which detection of an entity 118 triggers classification and interaction with the entity 118) may be determined based on characteristics or attributes of a geographic location. For example, a higher specified distance 122 of 20 meters could be selected when in geographic locations where vehicles are less likely to be parked closely to one another (e.g., suburban residential neighborhoods or rural locations). On the other hand, a lower specified distance 122 of 10 meters could be selected where vehicles are likely to be parked more closely to one another (e.g., an urban location, a parking garage or parking lot, etc.). A lower specified distance 122 may increase a frequency with which entities are classified and audio is output, and vice versa. Alternatively or additionally, a specified distance 122 may be selected by a vehicle operator. As an example, if the vehicle operator desires the vehicle 102 to only interact with entities which are close to the vehicle 102, the vehicle operator could set the specified distance 122 to 1 meter. The vehicle operator may select the specified distance 122 by any suitable means such as by providing input via a vehicle HMI 110.

The specified distance may be measured from the vehicle 102 while the vehicle 102 is stationary or while the vehicle is in motion. The entity 118 may be moving relative to the vehicle 102 while the vehicle is stationary or in motion and still be detected by the computer. As an example, the vehicle 102 may be backing down a driveway and an entity 118 may be approaching towards the rear of the vehicle 102. The computer may then detect the entity 118 within the specified distance.

The vehicle computer 104 may be programmed to, upon detecting that an entity 118 is within the specified distance 122 of the vehicle 102, actuate output of a first audio 124. The first 124 audio may be output outside of the vehicle 102 (e.g., via a vehicle external speaker) in response to detecting the entity 118. The first audio 124 may be any sound directed to be heard by the entity 118. The first audio 124 to be played may be selected by the vehicle computer 104 from the stored first audio 124 based on the classification of the entity 118 as described in further detail below. For example, the vehicle computer 104 can store and/or have access to a memory that stores various audio (e.g., sounds, words, phrases, etc.) that could be selected based on classification of an entity 118 and/or other factors. In an example, the vehicle computer 104 may store audio data (e.g., files or the like) for playback, and may further store associations between entities and/or entity classifications, whereby the computer 104, upon identifying and/or classifying an entity 118, can select audio data (e.g., a file) for output. This association could be stored in a table or the like. For example, the first audio 124 to be outputted to an owner of the vehicle per an audio table may be "Hello" along with the name of the owner. As another example, for specific entity classifications, an audio table could specify that no audio output is to be provided.

Example factors on which the selection of the first audio 124 by the vehicle computer 104 can include a time of day, weather conditions (e.g., presence or absence of precipitation) and/or other environmental conditions (e.g., a level of ambient light being above or below a time-of-flight threshold), a day of the week, day of the year, etc. As an example, if the vehicle computer 104 is actuating output of the first audio 124 at 9:00 am on January 1st, the vehicle computer 104 may select the first audio 124 to be "Good morning, and happy new year." As another example, if the vehicle computer 104 is actuating output of the first audio 124 during a storm or similarly violent weather event where a person may have difficulty hearing, the vehicle computer 104 could select the first audio 124 to be "Please seek shelter" whilst increasing the volume of the first audio 124 to compensate for any ambient noise.

As shown in FIG. 2, the entity 118 may output entity audio 126. "Entity audio" herein means a sound made by the entity 118 and detected by vehicle audio sensors. As an example, entity 118 audio may be a query posed by, or an exclamation of distress from, an entity 118 within a specified distance 122. Entity 118 audio is described further below.

The vehicle computer 104 may be programmed to classify the entity 118 based on entity audio 126, camera image data, and/or any other suitable data. The classification may include any suitable technique for object classification. A vehicle computer 104 could analyze data collected about the entity 118 using a machine learning program or a rules-based program and assign a confidence score to the entity 118 (typically a percentage that indicates an estimated likelihood, e.g., 90%, 99%, etc.) that the entity classification is correct.

The classification for a specific entity 118 may be selected from a plurality of stored classifications by the vehicle computer 104. The classifications can be determined to trigger respective actions by the vehicle computer 104 as described below. For example and without limitation, the vehicle computer 104 could classify a person detected within the specified distance 122 as threatening or nonthreatening.

The vehicle computer 104 may assign a risk score to the entity 118. Determining a risk score may be rules-based. That is, when specified conditions are met in the process of analyzing the data, the risk score may be increased or lowered. A specified condition in the present context means any condition or phenomenon detectable by vehicle sensors 106, and which according to programming in the computer 104 can influence the risk score of an entity 118. Examples of specified conditions include a speed with which an entity 118 is approaching the vehicle 102, a decibel level at which the entity 118 is outputting audio, a distance of the entity 118 from the vehicle 102 being within the specified distance 122, etc. If a specified conditions meets a threshold, the vehicle computer 104 may reduce or increase the entity's risk score (e.g., a distance of the entity 118 below the specified distance 122 could increase the risk score, detecting audio output by an entity 118 above a decibel threshold could increase the risk score, the entity 118 moving away from the vehicle 102 could decrease the risk score, etc.).

The computer 104 could store a table or the like associating specified conditions with risk scores based on empirical testing or design considerations such as how much risk may be tolerated. Further, a detected entity 118 could initially be defined a default risk score (e.g., 50 on a scale of zero to 100, or "threatening" or "non-threatening" where the risk score is a binary determination of whether the entity 118 appears to pose a risk (i.e., is threatening) or does not appear to pose a risk (i.e., is non-threatening)). The default risk score could be a risk threshold, that is, the computer 104 could be programmed so that risk scores below the risk threshold do not trigger action, whereas risk scores at or above the threshold do. For example, the computer 104 could store data specifying risk scores for entities that cannot be identified based on a distance from the vehicle 102. The computer 104 could alternatively or additionally store instructions to adjust a risk score based on a speed at which the entity 118 is moving with respect to the vehicle 102 (e.g., a positive speed (i.e., toward the vehicle 102) could result in increasing the risk score, whereas a negative speed (i.e., away from the vehicle 102) could decrease the risk score). For example, the computer 104 could detect an entity 118 within the specified distance 122, and further could determine that the entity 118 is approaching the vehicle 102 at a speed of 5 meters per second. The computer 104 could then (e.g., according to a stored table) increase the risk score by 5 points per every 1 meter per second over 1 meter per second that the entity 118 is approaching. In this example, therefore, the entity 118 would be assigned a risk score of 20. In this example, then the entity 118 has a risk score below the risk threshold. As another example of specified conditions, the vehicle computer 104 could detect that the entity 118 possesses a key or key fob or the like to access the vehicle 102 and therefore reduce the entity's risk score. As a further example, the vehicle computer 104 may detect, based on analyzing the data collected about the entity 118, that the entity 118 is swinging an object. The vehicle computer 104 may then increase the risk score of the entity 118.

Determining the risk score may further be based on stored data about the entity 118. That is, the computer 104 may assign a risk score based on a stored risk score of an entity 118. As an example of an adjustment of a risk score by the computer 104 based on a stored risk score, a risk score assigned to an entity 118 during a prior interaction could be retrieved from memory or obtained from a remote computer 104 upon identifying the entity 118. In such an example, the initial risk score assigned to the entity 118 could be the retrieved risk score rather than the default risk score described above. The default risk score could continue to represent a risk threshold in such examples. In addition to the risk score being based on specified conditions being met as mentioned above, the risk score may be increased or lowered based on a stored risk score. For example, a risk score assigned to an entity 118 during a prior interaction could be retrieved from memory or obtained from a remote computer 104 upon identifying the entity 118. In such an example, the computer 104 could assign the entity 118 a default risk score and increase or lower the risk score by an amount proportional to the stored risk score. The current risk score of the entity 118 could be increased by 5 if the stored risk score exceeded the risk threshold by 10, as an example.

The vehicle computer 104 may be programmed to assign risk scores to multiple entities 118. That is, if more than one entity 118 is detected within the specified distance, the computer 104 may perform all the functions described throughout this document for each entity 118 individually. For example, if a first entity (not numbered) is detected within the specified distance on one side of the vehicle 102, and a second entity (not numbered) is detected within the specified distance on a second side of the vehicle 102 at the same time, the computer may classify, assign a risk score to, identify, etc., the entities separately. The computer 104 may be further programmed to prioritize a first entity over a second entity based on the first entity being assigned a higher risk score than the second entity. That is, if two entities are detected within the specified distance and the first entity has been assigned a risk score exceeding the risk threshold, the computer 104 may treat both entities as having a risk score exceeding the risk threshold. For example, two persons may be within a specified distance of a vehicle 104. If the first person is calm (i.e. has a low risk score) and the second person is agitated (i.e. has a high risk score) the computer 104 may treat both as having a risk score above the risk threshold and take the actions described herein. Additionally, if an entity 118 is identified by the vehicle as described below, that entity 118 may still be assigned permissions despite the presence of an entity 118 with a risk score above the risk threshold. For example, if the first entity is identified as the vehicle owner and the second entity has a risk score above the risk threshold, the first entity will not be treated as having a risk score above the risk threshold.

As described further below, the vehicle computer 104 may actuate various vehicle components 108 (e.g., an audio output component as described above) based on the risk score exceeding a threshold, for example, exceeding the default risk score. As an example, a risk score above a risk threshold would result in the vehicle 102 locking vehicle doors, closing windows, and/or sending a message to a remote device, etc. Alternatively or additionally, a risk score below a threshold could result in the computer 104 actuating one or more vehicle components 108.

The risk score could be determined in other ways additional or alternative to initially assigning the default risk score, and may be determined based on any suitable feature or action of the entity 118. As an example, the risk score may be based on the measured decibels of the entity 118 audio. For example, the entity 118 yelling may increase their risk score, whereas the entity 118 speaking below a threshold decibel level may reduce, or not increase, the entity's risk score. The risk score may alternatively or additionally be determined based on physical actions being taken by the entity 118 (i.e., if the entity 118 is swinging their arms and/or holding an object) the risk score of the entity 118 may be increased. Further, the risk score may be increased or decreased based on a speed of the entity 118 measured by the sensors 106 (i.e., if the entity 118 is approaching the vehicle 102 at a specified speed or greater) this may increase their risk score.

As mentioned above, a risk score of the entity 118 may be based on stored data about the entity 118 (i.e., data that was collected or received by the vehicle computer 104 prior to a present detection of the entity 118). The vehicle computer 104 may store data collected about the entity 118 and retrieve the stored data upon identifying the entity 118 as previously detected and one for which stored data is available. For example, an entity 118 could be identified using known recognition techniques such as image recognition or voice recognition. Typically, such recognition techniques utilize machine learning. The vehicle computer 104 may retrieve stored data for an entity 118 and compare the stored data to new or current data once the vehicle computer 104 identifies the entity 118.

In an example, stored data about an entity 118 could be compared to currently collected data about the entity 118. For example, the vehicle computer 104 may determine an entity's risk score based on their speaking volume and body movements as described above. This risk score and the factors on which it was based may then be stored by the vehicle computer 104. At a later time (e.g., hours or days later) the vehicle computer 104 could then detect an entity 118 and collect further, current data about it. The stored data may then be retrieved upon a determinations that the stored data was collected from the same entity 118, use the stored data as well as any newly collected data in making determinations relating to the entity 118.

Additionally, the vehicle computer 104 may assign or determine permissions of an entity 118 upon identifying the entity 118 (or based on being unable to identify the entity 118). As examples, permissions could include "permitted to operate vehicle," "permitted to access the vehicle," "permitted to converse with the vehicle computer 104," etc. Such permissions may be based on the preferences of the vehicle owner or based on determinations made by the vehicle computer 104. For example, the vehicle owner could assign a permission to operate a vehicle 102 to another user. Further, the vehicle computer 104 may prompt the entity 118 for image data of a driver's license in order to confirm that the entity 118 is the acquaintance or could use object recognition techniques to determine the identity 118 of the acquaintance.

The entity's risk score may be increased or lowered based on data collected after outputting a first audio 124. This data may include the tone of voice used by the entity 118, body language of the entity 118, whether the entity 118 is holding an object, etc. The vehicle computer 104 may further be programmed to assign permissions to the entity 118 based on the data collected after outputting the first audio 124. As an example, the vehicle computer 104 may increase or lower the risk score of the entity 118 based on a tone of voice of the entity 118. "Tone" as used herein refers to the inflections used by a person when speaking. Such inflections may be detected by the vehicle computer 104 and used to determine risk score and/or make classifications (i.e., if the tone of voice of the entity 118 is determined by the vehicle computer 104 to be "agitated," the vehicle computer 104 could increase the risk score of the entity 118). As another example, if the tone of voice of the entity 118 is determined to be "questioning," the vehicle computer 104 may lower the risk score of the entity 118. Tone may be measured by analyzing entity audio data for speed of speaking, volume, and pitch. For example, the computer may store a table specifying certain tones attached to certain notes. When the computer detects that the pitch of the entity audio is a certain note, the computer look up the corresponding tone for that note. The table may further store a table specifying certain tones attached to speaking speed and volume. The vehicle computer 104 may determine the tone of voice of the entity 118 using any suitable technique (e.g., a machine learning program trained to classify entities based on tones). For example, by the machine learning program, the vehicle computer 104 may detect that a pitch of the person's voice rises at the end of a sentence which could indicate that the tone of the person is questioning, thereby lowering the risk score. As another example, the vehicle computer 104 may detect that the pitch of the person's voice remains low and gruff, which could indicate hostility and may raise their risk score.

The vehicle computer 104 may store a permissions table or the like indicating what permissions are granted to respective entities that could be identified. For example, user John Doe could be given full permission to access and operate the vehicle 102.

The vehicle computer 104 may be programmed to classify the entity 118 based on image data from one or more vehicle sensors 106. Classifying the entity 118 means determining a type or category of the entity 118 according to any suitable technique. For example, various techniques can be used to analyze data from cameras or other sensors 106 to determine a type or category of entity 118. A type or category of entity 118 means a kind of object, etc., a person, a bicycle, a vehicle, a rock, etc. Image data used for entity classification and/or other purposes (e.g., determining entity behavior such as direction and/or speed of movements) may be a plurality of images collected at different times. For example, analyzing a plurality of images collected at different times may allow the vehicle computer 104 to determine if the entity 118 is walking towards the vehicle 102 or waving their hand.

An entity classification may be based on data collected about the entity 118 after outputting the first audio 124 from vehicle speakers and then detecting further data about or from the entity 118. That is, in addition or alternative to collecting data about the entity 118 upon detecting the entity 118 within the specified distance 122 (i.e. prior to outputting the first audio 124) the vehicle computer 104 may collect further data about the entity 118 after the vehicle computer 104 has output the first audio 124 described above. In such an example, the vehicle computer 104 could detect but not classify or identify the entity 118 prior to outputting the first audio 124. As an example, an entity 118 could be detected within the specified distance 122. The vehicle computer 104 may then output the first audio 124 in the form of a greeting such as "hello." The vehicle computer 104 may then collect further data about the entity 118, and could use the further data to classify and or identify the entity 118.

As described above the vehicle computer 104 may further be programmed to assign classifications to the entity 118 based on the data collected after outputting the first audio 124. For example, the entity 118 may output audio as described above (i.e. the entity 118 may speak to the vehicle 102). The entity 118 could output an audio such as asking, "Who owns this vehicle?" Then the vehicle computer 104 may collect further data about the entity 118 and classify the entity 118 as a person due to the entity's usage of language. As another example the entity 118 could output an audio such as the barking of the dog which could be used by the computer 104 to classify the entity 118 as a dog.

The vehicle computer 104 may be programmed to output a second audio based on classifying the entity 118. The vehicle computer 104 may select the second audio from a list of sounds and phrases as described above relative to the first audio 124. The second audio is selected by the vehicle computer 104 based on the classification of the entity 118. For example, if the vehicle computer 104 has assigned an entity 118 a classification of "non-threatening" and given a "vehicle owner" permission (e.g. identified the entity 118 as the vehicle owner) the vehicle computer 104 may output a second audio greeting the vehicle owner by name. As another example, the second audio may be responsive to a communication by the entity 118. If the vehicle computer 104 has assigned the entity 118 a classification of "non-threatening" and a permission of "stranger," (e.g. identified the entity 118 as a stranger) the vehicle computer 104 may output a second audio comprising an answer to a question asked by the entity 118. In other words, the second audio may be selected from the stored plurality of phrases based on a verbal response by the entity 118 to the first audio 124. As a further example, if the vehicle computer 104 has assigned a classification of "threatening" to the entity 118, and the entity 118 has a risk score above a risk threshold, the vehicle computer 104 may output a second audio requesting that the entity 118 depart.

The vehicle computer 104 may be programmed to output a second audio based on the entity audio 126. For example, the vehicle computer 104 may have a default language. The default language may be English in the United States, German in Germany, any language selected by the vehicle owner, etc. If the entity 118 outputs an entity audio 126 in a language that is not the default language, the computer 104 may output the second audio in the language spoken by the entity 118. The vehicle computer 104 may use known language recognition techniques to recognize the language spoken by the entity 118.

As described above, the vehicle computer 104 may be programmed to activate a vehicle feature based on classifying the entity 118. For example, based on classifying the entity 118 as "non-threatening" and assigning permissions of "vehicle owner," (e.g. identifying the entity 118 as the vehicle owner) the vehicle computer 104 may unlock the doors, start the engine, or activate any feature of the vehicle 102. Conversely, and as another example, if the entity 118 is classified as "non-threatening" and given a permission of "permitted to access vehicle," (e.g. identified as a person known to the vehicle owner) the vehicle computer 104 may unlock the vehicle doors but not necessarily start the engine. As a further example, if the entity 118 is classified as "threatening," (e.g. the entity 118 has a risk score above a risk threshold) the vehicle computer 104 may send a communication to the vehicle owner alerting the vehicle owner of the entity 118.

Example Processes

Figure 3:
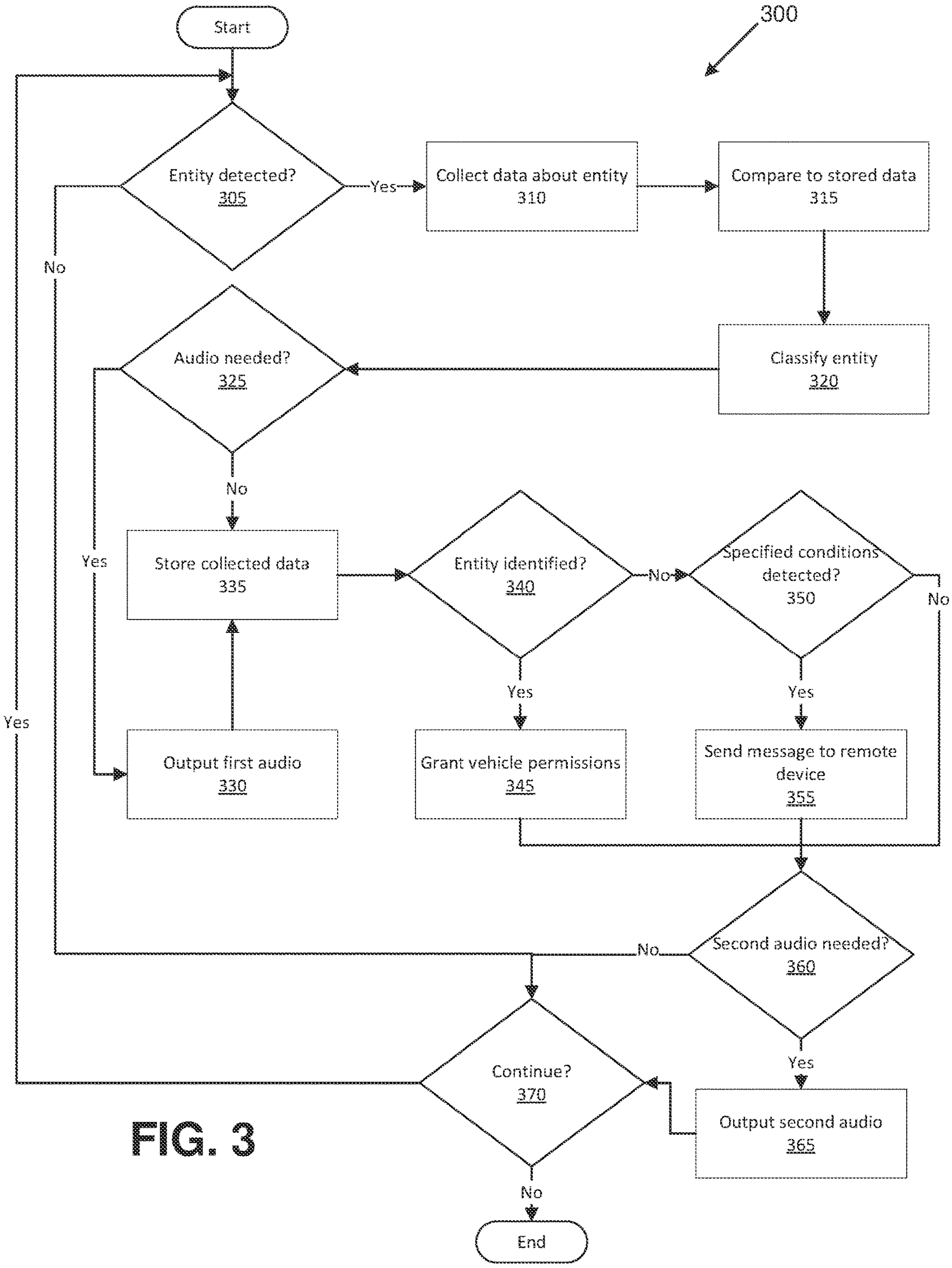
FIG. 3 is a process flow diagram illustrating an example process for actuating vehicle components based on entities proximate to the vehicle.

FIG. 3 shows a process flow diagram of an example process 300 for detecting and interacting with entities within a specified distance 122 of a vehicle 102. The process can be carried out according to program instructions executed by the vehicle computer 104. The process begins in a decision block 305 in which the computer 104 determines whether an entity 118 has been detected. The detection of an entity 118 is described in greater detail above. If the computer 104 does not detect an entity 118 within the specified distance 122 of the vehicle 102, the process continues to block 370. If the vehicle computer 104 does detect an entity 118 within the specified distance 122 of the vehicle 102, the process continues to block 310.

Next, in a block 310, the computer 104 actuates sensors 106 to collect data about the entity 118. In some implementations, actuating or activating sensors may not be necessary because sensors may already be active. However, in some implementations, various sensors 106 such as camera sensors or the like may be inactive (e.g., to conserve power while a vehicle 102 is parked) and accordingly sensors 106 can be actuated and/activated upon an entity 118 being detected. There may be a plurality of sensors that is less than all available vehicle sensors which are powered up or active at all times to monitor for an entity 118 within the specified distance 122 as described above. For example, when a vehicle 102 is in a KEY-OFF state or the like, one or more sensors could be provided to monitor vehicle surroundings (e.g., to provide a field or fields of view 120 around the vehicle 102) and detect entities. Once an entity 118 is detected, the vehicle computer 104 could then actuate the remaining sensors 106 to begin collecting further data about the entity 118.

Next, in a block 315, the computer 104 compares the data collected in block 310 to stored data. As described above, the computer 104 may store data collected about an entity 118 to be retrieved later. The comparison of stored data to the newly collected data may begin once collection of data has begun.

Next, in a block 320, the computer 104 classifies the entity 118. As described above, classification of the entity 118 may be based on data collected from the entity 118 and on previously stored data about the entity 118.

Next, in a decision block 325, the computer 104 determines whether to output a first audio 124. The computer 104 may determine not to output a first audio 124. For example, if the entity 118 is classified as an animal or as another vehicle, the computer 104 may not output a first audio 124. Likewise, if the entity 118 is a person that passes within the specified distance 122 and moves away (i.e. walks by the vehicle 102) the computer 104 may not output a first audio 124.

Next, in a block 330, the computer 104 outputs first audio 124 such as described above. The vehicle computer 104 may select the first audio 124 to be played from the stored first audios based on the classification and identification of the entity 118. As an example, if the entity 118 is identified by the computer 104 as a stranger asking a question, the first audio 124 may be an answer to the question. If the entity 118 is identified as the owner of the vehicle 102, the first audio 124 may be a welcome to the owner.

Next, in a block 335, the computer 104 stores the data collected about the entity 118. As described above, the data can be later retrieved to identify and/or assign a risk score to the entity 118.

Next, in decision block 340, the computer 104 determines whether the entity 118 has been identified. That is, an individual entity 118 (e.g., a person) can be identified using a suitable technique as described above. As an example, if the vehicle computer 104 detects an audio output of the entity 118, the vehicle computer 104 may use a voice recognition technique to compare the audio to stored audio data and then identify the entity 118. If the stored audio data and the newly collected audio data are determined by the computer 104 to be from the same entity 118, then the computer 104 tags the entity 118 as identified. If the entity 118 is identified the process continues to block 345. Otherwise, the process continues to block 350.

In a block 345, the vehicle computer 104 has identified the entity 118. The vehicle computer 104 then could grant vehicle permissions to the entity 118. Permissions may be based on a permissions table or the like as described above. Further, the entity 118 could be identified but have no associated permissions, in which case none may be granted.

In decision block 350, the computer 104 has previously determined that the entity 118 is not identified by the vehicle computer 104. The computer 104 then analyzes the data collected in block 310 for the specified conditions to determine the risk score of the entity 118 as described above. If the computer 104 increases the entity's risk score to the risk threshold or beyond the risk threshold, the process continues to block 355. Else, the process continues to decision block 360.

Next, in a block, 355 the vehicle computer 104 can send a message to a remote device. The remote device may be any suitable computing device other than the vehicle computer 104, such as a mobile device or smartphone or the like. When the specified conditions are detected in the previous block (i.e. the entity's risk score exceeds the risk threshold) the vehicle computer 104 may send a message to the mobile device of the vehicle owner alerting them of the entity 118 and/or send a message to a law enforcement device requesting assistance.

Next, in a decision block 360, the computer 104 determines whether a second output should be output. The computer 104 may determine not to output a second audio. For example, if the entity 118 was identified as a person asking a question and the first audio 124 answered the question thus causing the entity 118 to depart, the computer 104 may determine not to output a second audio. As another example, if the entity 118 was identified as the vehicle owner and the vehicle owner has entered the vehicle 102, the computer 104 may determine not to output a second audio. As described above, the vehicle computer 104 may output the second audio in a language of the entity 118 (i.e. Spanish if the entity audio was Spanish). As a further example, if the entity 118 has been assigned a risk score above the risk threshold, the computer 104 may output a second audio as mentioned below. If the computer 104 determines to output a second audio, the process continues to block 365. Otherwise, the process continues to decision block 370.

Next, in a block 365, the computer 104 actuates a vehicle component 108 to output a second audio. As described above the vehicle computer 104 may select the second audio from a list of sounds and phrases as described above relative to the first audio 124. The second audio is selected by the vehicle computer 104 based on the risk score and/or identification of the entity 118. That is, the second audio is selected to conform to the risk score and/or of the entity 118. For example, if the vehicle computer 104 has identified the entity 118 as the owner of the vehicle 102, the vehicle computer 104 may output a second audio greeting the vehicle owner by name. As another example, the second audio may be responsive to a communication by the entity 118. If the vehicle 102 has identified the entity 118 as a person asking a question, the vehicle computer 104 may output a second audio comprising an answer to the question asked by the entity 118. In other words, the second audio may be selected from the stored plurality of phrases based on a verbal response by the entity 118 to the first audio 124. As a further example, if the vehicle computer 104 has assigned a risk score to the entity 118 above a risk threshold as described above, the vehicle computer 104 may output a second audio requesting that the entity 118 depart.

In decision block 370, the computer 104 determines whether to continue the process. For example, once the process 300 is initiated, the computer 104 could continue to monitor for the detection of entities 118 within the specified distance 122 of the vehicle 102 by returning to block 305. However, the process could end upon some input or event to terminate the process, such as a vehicle user commencing operation of the vehicle 102 (e.g., activating a propulsion system such as an engine) a user providing input to end the process, etc. If the process 300 is to continue, then the process returns to the block 305, otherwise the process 300 ends.

Computing devices such as those discussed herein generally each includes commands executable by one or more computing devices such as those identified above, and for carrying out blocks or steps of processes described above. For example, process blocks discussed above may be embodied as computer executable commands.

Computer executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (i.e., a microprocessor) receives commands (i.e. from a memory, a computer readable medium, etc.) and executes these commands, thereby performing one or more processes, including one or more of the processes described herein. Such commands and other data may be stored in files and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer 104 (i.e., by a processor of a computer 104). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 104. Common forms of computer-readable media include, for example, RAM, a PROM, an EPROM, a FLASH-EEPROM, any other memory chip or cartridge, or any other medium from which a computer 104 can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

In the drawings, the same candidate numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Use of in response to, based on, and upon determining herein indicates a causal relationship, not merely a temporal relationship. "Based on" or "in response to" can mean based at least partly on or at least partly in response to unless explicitly stated otherwise.

Examples are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. It will be understood that the usage of the terms "first" and "second" are merely identifying and not necessarily indicative of priority.

The invention claimed is:

1. A system, comprising a computer having a processor and a memory, the memory storing instructions executable by the processor to:

detect an entity within a specified distance of a vehicle;

output a first audio outside of the vehicle in response to detecting the entity;

classify the entity based on data about the entity reacting to the first audio, the data collected about the entity after outputting the first audio;

assign a permission to the entity based on classifying the entity according to the entity reacting to the first audio, the permission specifying actions with respect to the vehicle that the entity is permitted to perform; and output a second audio based on classifying the entity and based on the permission.

2. The system of claim 1, the instructions including further instructions to activate a vehicle feature based on classifying the entity.

3. The system of claim 1, wherein the detection of the entity within the specified distance of the vehicle is based on image data.

4. The system of claim 1, wherein the second audio is responsive to a verbal communication by the entity.

5. The system of claim 1, wherein the second audio is selected from a stored plurality of phrases.

6. The system of claim 1, the instructions including further instructions to identify the entity based on stored data collected from the entity prior to outputting the first audio.

7. The system of claim 1, the instructions including further instructions to classify the entity based on a plurality of images collected at different times.

8. The system of claim 1, wherein the classification of the entity is at least one of threatening and nonthreatening.

9. The system of claim 1, wherein the first audio is output in a first language and the second audio is output in a second language based on detecting the second language in an entity audio.

10. The system of claim 1, further comprising detecting a first entity and a second entity within the specified distance of the vehicle, the first entity being prioritized based on a risk score.

11. The system of claim 1, wherein the instructions further include instructions to select the second audio from a list of phrases based on classifying the entity and based on the permission.

12. The system of claim 1, wherein the permission is selected from a plurality of stored permissions, and the stored permissions include that the entity is permitted to operate the vehicle.

13. The system of claim 12, wherein the stored permissions include that the entity is permitted to converse with the computer.

14. The system of claim 1, wherein the instructions to output the second audio include instructions to output the second audio based on a combination of classifying the entity as threatening or nonthreatening and the permission.

15. A method comprising:

detecting an entity within a specified distance of a vehicle;

outputting a first audio outside of the vehicle in response to detecting the entity;

classifying the entity based on data about the entity reacting to the first audio, the data collected about the entity after outputting the first audio;

assigning a permission to the entity based on classifying the entity according to the entity reacting to the first audio, the permission specifying actions with respect to the vehicle that the entity is permitted to perform; and outputting a second audio based on classifying the entity and based on the permission.

16. The method of claim 15, further comprising activating a vehicle feature based on classifying the entity.

17. The method of claim 15, wherein detecting the entity within the specified distance of the vehicle is based on image data.

18. The method of claim 15, wherein the second audio is responsive to a verbal communication by the entity.

19. The method of claim 15, wherein the second audio is selected from a stored plurality of phrases.

20. The method of claim 15, further comprising identifying the entity based on stored data collected from the entity prior to outputting the first audio.

* * * * *